United States Patent [19]

Duboudin et al.

[11] Patent Number: 5,049,529

[45] Date of Patent: Sep. 17, 1991

[54] CONVERSION OF POLYCARBOSILANES INTO SILICON CARBONITRIDE CERAMICS

[75] Inventors: Francoise Duboudin, Pessac; Jean-Paul Pillot, Chestas; Jacques Dunogues, Talence; Marc Birot, Leognan; Odile Babot, Villenave D'Ornon; Rene Pailler, Cestas, all of France

[73] Assignee: Rhone-Poulenc Chimie, Courbevoie, France

[21] Appl. No.: 442,647

[22] Filed: Nov. 27, 1989

[30] Foreign Application Priority Data

Nov. 25, 1988 [FR] France .................. 88 15393

[51] Int. Cl.$^5$ .............................................. C04B 35/58
[52] U.S. Cl. ........................................... 501/97; 501/96
[58] Field of Search ...................... 501/96, 97; 528/10, 528/31; 525/474; 556/530

[56] References Cited

U.S. PATENT DOCUMENTS

| | | | |
|---|---|---|---|
| 4,650,773 | 3/1987 | Okamura et al. | 501/95 |
| 4,761,389 | 8/1988 | Rabe et al. | 501/95 |

FOREIGN PATENT DOCUMENTS

| | | |
|---|---|---|
| 0051855 | 5/1982 | European Pat. Off. . |
| 0200326 | 12/1986 | European Pat. Off. . |
| 0208630 | 1/1987 | European Pat. Off. . |
| 0245047 | 11/1987 | European Pat. Off. . |
| 0259944 | 3/1988 | European Pat. Off. . |
| 0266860 | 5/1988 | European Pat. Off. . |
| 0280387 | 8/1988 | European Pat. Off. . |

OTHER PUBLICATIONS

"Ceramic Fibres From Polymer Precursors", K. Okamura, Guildford, Surrey, vol. 18, No. 2, Avril 1987, pp. 107–120, Butterworth & Co., Ltd.

*Primary Examiner*—William R. Dixon, Jr.
*Assistant Examiner*—Anthony J. Green
*Attorney, Agent, or Firm*—Burns, Doane, Swecker & Mathis

[57] ABSTRACT

Silicon carbonitride ceramic materials are produced by (a) hardening a fusible polycarbosilane containing at least two $\equiv$SiH groups per molecule by intimately contacting such fusible polycarbosilane with an effective hardening amount of the vapors of sulfur, next (b) heat treating the infusible polycarbosilane which results under an ammonia atmosphere to such extent as to introduce nitrogen into the infusible polycarbosilane without completely removing the carbon therefrom, and then (c) heat treating the nitrogenated polycarbosilane in a vacuum or in an inert atmosphere to such extent as to essentially completely convert it into a ceramic silicon carbonitride.

12 Claims, No Drawings

CONVERSION OF POLYCARBOSILANES INTO SILICON CARBONITRIDE CERAMICS

CROSS-REFERENCE TO COMPANION APPLICATIONS

Copending applications Ser. No. 441691 [Attorney Docket No. 022700-984], Ser. No. 441692 and Ser. No. 441693 each filed concurrently herewith and each assigned to the assignee hereof.

BACKGROUND OF THE INVENTION

1. Field of the Invention

The present invention relates to the production of ceramic articles based on silicon carbonitride and, more especially, to the production of such ceramics from organosilicon compounds of the polycarbosilane type.

1. Description of the Prior Art

The production of ceramic articles by thermal degradation of organosilicon polymers in a controlled atmosphere is known to this art; numerous literature articles and patents exist on the subject.

One advantage of this "polymer" technique resides, in particular, in the possibilities for shaping this type of product, notably into ceramic fibers, after pyrolysis thereof.

According to the conventional technique, the polymer precursors of polycarbosilane type (possibly after the melting thereof, if originally they are in the solid state) are extruded in the form of continuous fibers (or filaments), which subsequently are treated, in particular to improve their high temperature and/or mechanical strength, and then pyrolyzed in a suitable atmosphere to produce the desired ceramic fiber.

The pretreatment of the fibers prior to pyrolysis, typically designated a hardening, infusibility or crosslinking treatment, is an essential stage in any process for the preparation of ceramic fibers.

At the present time, the hardening of polycarbosilane fibers entails either physical techniques (electronic, UV-irradiation, etc.) or chemical techniques.

The aforementioned physical techniques have the major disadvantage of being awkward and expensive. Therefore, the only economical technique utilized on an industrial scale is chemical hardening by means of an oxygen treatment.

It too is known to this art:

(a) that the pyrolysis of a polycarbosilane pretreated physically or with oxygen, under an inert atmosphere or in vacuum, provides a ceramic material based on silicon carbide;

(b) that the pyrolysis under ammonia of a polycarbosilane pretreated with oxygen in all cases provides ceramic articles containing silicon oxynitride values (as a result of the introduction of oxygen during the pretreatment); and, finally, (c) that the pyrolysis under ammonia of a physically pretreated polycarbosilane provides, depending upon the temperature used, either silicon carbonitride or silicon nitride (partial or total substitution of carbon atoms by nitrogen atoms).

Therefore, serious need continues to exist in this art for a process for the preparation of silicon carbonitride from polycarbosilanes which avoids the disadvantages resulting from the necessary utilization of the aforementioned physical pretreatments.

SUMMARY OF THE INVENTION

Accordingly, a major object of the present invention is the provision of a simple, effective, economical and easily carried out technique for the production of ceramic articles based on silicon carbonitride in a very wide variety of forms (filaments, fibers, molded articles, coatings, films, and the like), which technique conspicuously avoids those disadvantages and drawbacks to date characterizing the state of this art.

Briefly, the present invention features an improved process for the preparation of ceramic materials based on silicon carbonitride by the pretreatment and heat treatment/pyrolysis of at least one polycarbosilane under an ammonia atmosphere, such polycarbosilane having at least two $\equiv$SiH groups per molecule, said pretreatment comprising intimately contacting the polycarbosilane with sulfur in the vapor state, and said heat treatment/pyrolysis comprising first heat treating the thus hardened polycarbosilane in an ammonia atmosphere and thereafter, at an elevated temperature, in a vacuum or in an inert atmosphere.

As will hereinafter be seen, by appropriately varying the conditions of pyrolysis/heat treatment, a wide range of silicon carbonitride ceramics can be produced, thus providing the added advantage of very great flexibility.

DETAILED DESCRIPTION OF THE PREFERRED EMBODIMENTS OF THE INVENTION

More particularly according to the present invention, the polycarbosilane starting materials are polymers well known to this art; these polymers may be prepared from a very wide variety of beginning intermediates utilizing a wide variety of different techniques.

It will of course be appreciated that polycarbosilanes are organosilicon compounds having carbon atoms and silicon atoms as the principal components of their molecular skeletons and which may have structures of the linear, cyclic or mixed type, i.e., structures in which linear carbosilane recurring units and cyclic carbosilane recurring units are bonded chemically.

According to the present invention, such polycarbosilanes must contain at least two and preferably at least three $\equiv$SiH groups per molecule.

The synthesis of such polycarbosilanes may be carried out by the techniques described, in particular, in FR 2,308,590, FR 2,308,650, FR 2,327,836, FR 2,345,477, FR 2,487,364 and EP 51,855, all of which are hereby expressly incorporated by reference.

Prior to the hardening treatment according to the invention (more fully described below), the polycarbosilanes are formed by any one of a number of shaping operations to impart various configurations thereto, such as filaments, fibers, molded articles, support coatings and the like. The treatment according to the invention is thus advantageously used for the hardening of polycarbosilane fibers which, after treatment, are then pyrolyzed in ammonia to produce ceramic fibers based on silicon carbonitride.

According to the invention and after optional forming, the polycarbosilanes described above are then treated with sulfur vapors.

The sulfur vapors may be used in the pure state, or they may be diluted in an inert gas, such as argon (or any other rare gas) or nitrogen, for example.

The polycarbosilanes and the vapors may be intimately contacted with each other in a static or a dynamic state, i.e., in a flowstream of vapors.

The vapors may be generated by any known means, in particular by the vaporization of sulfur, or by the decomposition of any compound capable of generating sulfur under the practical conditions of the treatment according to the invention.

The temperature at which the treatment is carried out may vary widely and depends on the nature of the polycarbosilane to be hardened.

In practice, this temperature generally ranges from 150° C to the softening temperature of the polymer; it is even possible to conduct the operation at temperatures higher than the softening point in light of the quasi-instantaneous nature of the polycarbosilane hardening treatment in the presence of sulfur vapors. Nevertheless, and preferably, the temperature of the treatment advantageously ranges from 200° C to a temperature slightly less than that corresponding to the softening point of the polycarbosilane to be hardened.

The duration of the treatment according to the invention is not critical and may vary from a few seconds to several days and preferably from a few minutes to several hours.

In general, this duration depends on the temperature of the treatment; the higher the temperature, the shorter the duration may be.

Upon completion of the treatment according to the invention, a polycarbosilane that is perfectly infusible and insoluble in most organic solvents, in particular in hexane, is obtained.

Depending on the amount of the sulfur used, the duration and the temperature of the treatment, together with the nature of the initial polycarbosilane, the treated product may contain quantities of sulfur generally ranging from 3% to 30% by weight relative to the total weight of the product, and preferably ranging from 10% to 20% by weight.

Without wishing to be bound to any particular theory, the gradual disappearance of the $\equiv$SiH bands observable by infra-red analysis of the polymer over the course of the treatment would appear to indicate that the hardening according to the invention may take place by the creation of bonds of the $\equiv$Si—S—Si$\equiv$ type within said polymer.

The sulfur incorporated in this manner may be gradually eliminated during the subsequent heat treatments carried out to convert the hardened polycarbosilane into a silicon carbonitride ceramic, as more fully described below.

The first heat treatment, which is carried out in an ammonia atmosphere, introduces nitrogen into the polycarbosilane matrix.

The ammonia atmosphere may either be static or dynamic.

The temperature of this first heat treatment advantageously ranges from approximately 25° to 900° C; its duration ranges from a few minutes to several hours.

At relatively moderate heat treating temperatures, i.e., not exceeding about 500° C, nitrogen is introduced by the replacement and elimination of the sulfur previously contained in the hardened polycarbosilane. Overall, the molar amount of nitrogen that may be introduced into said polycarbosilane essentially corresponds to the molar amount of sulfur initially present.

Under these conditions, and if the treatment is continued to its completion, the amount of residual sulfur in the treated product may be very low.

If the operation is carried out at higher temperatures, i.e., at temperatures ranging from approximately 500° to 900° C, additional amounts of nitrogen may be introduced, but in this instance by a different reaction mechanism: the replacement of carbon by nitrogen.

It is nonetheless necessary to avoid operating at excessively high temperatures, i.e., close to or higher than about 900° C, such as not to completely eliminate the carbon, which would result in the production of silicon nitride, but not the desired silicon carbonitride.

After the introduction of the desired amount of nitrogen into the polycarbosilane, the product is subjected to a second heat treatment to convert it into the desired silicon carbonitride ceramic.

This second heat treatment is carried out in a vacuum or in an inert atmosphere such as argon (or any other rare gas) or nitrogen, at a temperature ranging from 800° to 1,500° C, until the product is completely converted into a ceramic based on silicon carbonitride.

As indicated above, the process according to the invention is particularly suitable for the production of ceramic fibers based on silicon carbonitride. These are useful, for example, for the reinforcement of composite materials comprising a glass, plastic, metal, ceramic or other matrix.

In order to further illustrate the present invention and the advantages thereof, the following specific examples are given, it being understood that same are intended only as illustrative and in nowise limitative.

In said examples to follow, the production of ceramic fibers based on silicon carbonitride was featured.

EXAMPLES

Preparation of Polycarbosilane Fibers

The polycarbosilane used was synthesized by heating a polydimethylsilane at 470° C in an autoclave, according to the technique described by S. Yajima et al, *J. Mater. Sci.* (13), 2569 (1978) and FR 2,308,650.

The selective elimination of high molecular weight polymers contained in the polycarbosilane specimens prepared in this manner (optional, but preferred stage in the extrusion of the fibers) may be carried out, in particular, by the selective dissolution of the polymers of moderate to high molecular weights in ethyl acetate (at a temperature of from 30° to 50° C), then recovering the polycarbosilane fraction thus dissolved. See copending application Ser. No. 441691, filed concurrently herewith.

Commercial polycarbosilanes, such as those marketed by Nippon Carbon Co., are also suitable starting materials.

The polycarbosilanes obtained in this manner were then extruded and drawn in the form of fibers having an average diameter of 15 μm.

Hardening of the Polycarbosilane Fibers

The apparatus for hardening by sulfur was a tubular enclosure heated by a resistance furnace, into which a slight current of purified argon was introduced (or purified nitrogen). A boat containing solid sulfur, located in the upstream end of the enclosure where the temperature was higher than 140° C, released sulfur in the form of a vapor thereof. The released sulfur was transported by the carrier gas into contact with the polycarbosilane fibers, which had been placed into a second boat located in a downstream end of the enclosure, where the prevailing temperature was $\Theta_1$.

The rate of the increase in temperature to $\Theta_1$ was regulated as follows:

(i) ambient→140° C : 60° C/hour;
(ii) 140° C→$\Theta_1$ : 5° C/hour.

Table I summarizes the different hardening experiments (Experiments A1 to A5) for each different $\Theta_1$.

The fibers produced upon completion of the treatment were infusible (or nearly infusible in the case of Experiment A2) and insoluble, in particular in hexane.

Experiment B2 was carried out using fibers treated with sulfur, but not treated under ammonia; the fibers obtained were thus based on silicon carbide. Examples B8 and B9 relate to fibers that were not converted into ceramic materials.

In all other experiments, the fibers obtained were based on silicon carbonitride. Note: The weight percentages of sulfur appeared to be higher in Experiments B2, B3, B4 and B8 than in the initial product (Experiment A4), which is explained by the fact that during the heat treatment other elements may be eliminated more rapidly than sulfur.

TABLE II

| Experiment | Conditions of NH$_3$ Treatment ($\Theta_2/t_2$) | Conditions of Pyrolysis ($\Theta_3/t_3$) | % S by weight | % N by weight | Appearance of the fibers |
|---|---|---|---|---|---|
| B1* | 700° C./1 h | 950° C./1 h | 0 | 26 | molten black fibers |
| B2 | without treatment | 850° C./30 min | 9 | 0 | deep brown non-adhesive fibers |
| B3* | 220° C./30 min | 950° C./1 h | 8.3 | 2.5 | intact black fibers |
| B4 | 300° C./30 min | 850° C./30 min | 6.5 | 1 | nonadhesive black fibers |
| B5 | 500° C./30 min | 850° C./30 min and 1,400° C./15 min | 0.3 | 3 | nonadhesive black fibers |
| B6 | 500° C./30 min | 850° C./30 min | 1 | 3 | nonadhesive black fibers |
| B7 | 500° C./30 min | 850° C./30 min and 1,200° C./15 min | 0.4 | 4.5 | nonadhesive black fibers |
| B8* | 370° C./30 min | without pyrolysis | 9.5 | 0.85 | orange fibers |
| B9* | 570° C./1 h | without pyrolysis | 0.3 | 13 | orange fibers |

*signifies that the fiber was treated with ammonia in a thermogravic analyzer

Infra-red analysis indicated the gradual disappearance of the $\sqrt{}$(Si-H) band present in the initial polycarbosilane with increasing sulfur contents.

TABLE I

| Experiment | Hardening temperature ($\Theta_1$) | Maintenance time (at $\Theta_1$) | Weight % of S on treated fibers | Appearance | Remarks |
|---|---|---|---|---|---|
| A1 (Comparative) | — | — | 0 | white | without treatment F |
| A2 | 180° C. | 4 h | 3.5 | straw yellow | I/F |
| A3 | 200° C. | 4 h | 4.5 | ↓ | I |
| A4 | 220° C. | 4 h | 6 | ↓ | I |
| A5 | 240° C. | 4 h | 7 | light brown | I |

Note:
F indicates fusible
I indicates infusible

Treatment in an Ammonia Atmosphere and Pyrolysis of the Fibers

The fibers obtained after treatment according to Experiment A4 were placed either in a tubular furnace of a thermogravimetric analyzer and gradually heated to a temperature $\Theta_2$ and maintained at this temperature for a time $t_2$ ranging from 30 to 60 min., under a flowstream of purified ammonia (flow rate: 10 ml/min).

Pyrolysis was carried out either in a sealed silica ampoule, under vacuum at a temperature of 850° C, or under a flowstream of purified argon at other temperatures ($\Theta_3$: temperature of pyrolysis; $t_3$ time at said temperature).

Table II summarizes the different results obtained (Experiments B1 to B9). Experiment B1 was carried out using fibers that had not been treated with sulfur (comparative experiment).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of a silicon carbonitride ceramic material, comprising (a) hardening a fusible polycarbosilane containing at least two $\equiv$SiH groups per molecule by intimately contacting same with an effective hardening amount of gaseous elemental sulfur to produce an infusible polycarbosilane, next (b) heat treating the infusible polycarbosilane in an ammonia atmosphere to introduce nitrogen into said infusible polycarbosilane by replacement of sulfur in the polycarbosilane without completely removing the carbon therefrom, and then (c) heat treating said nitrogenated polycarbosilane in a vacuum or in an inert atmosphere to essentially completely convert it into a ceramic silicon carbonitride.

2. The process as defined by claim 1, wherein said fusible polycarbosilane contains at least three ≡SiH groups per molecule.

3. The process as defined by claim 1, said step (a) being carried out at a temperature ranging from 150° C to the softening point of said fusible polycarbosilane.

4. The process as defined by claim 3, said step (a) being carried out at a temperature ranging from 200° C to slightly less than the softening point of said fusible polycarbosilane.

5. The process as defined by claim 1, said vapors of sulfur being diluted in an inert gas.

6. The process as defined by claim 5, said inert gas comprising argon or nitrogen.

7. The process as defined by claim 1, said step (a) being carried out statically.

8. The process as defined by claim 1, said step (a) being carried out dynamically.

9. The process as defined by claim 1, wherein the fusible polycarbosilane is a shaped article thereof.

10. The process as defined by claim 9, wherein the shaped article is a fiber or filament.

11. The process as defined by claim 1, said step (b) being carried out at a temperature ranging from 25° to 900° C.

12. The process as defined by claim 11, said step (c) being carried out at a temperature ranging from 800° to 1,500° C.

* * * * *